Aug. 28, 1962 — E. T. PETERSON — 3,051,293
BAR SEPARATOR
Filed March 23, 1960 — 5 Sheets-Sheet 1
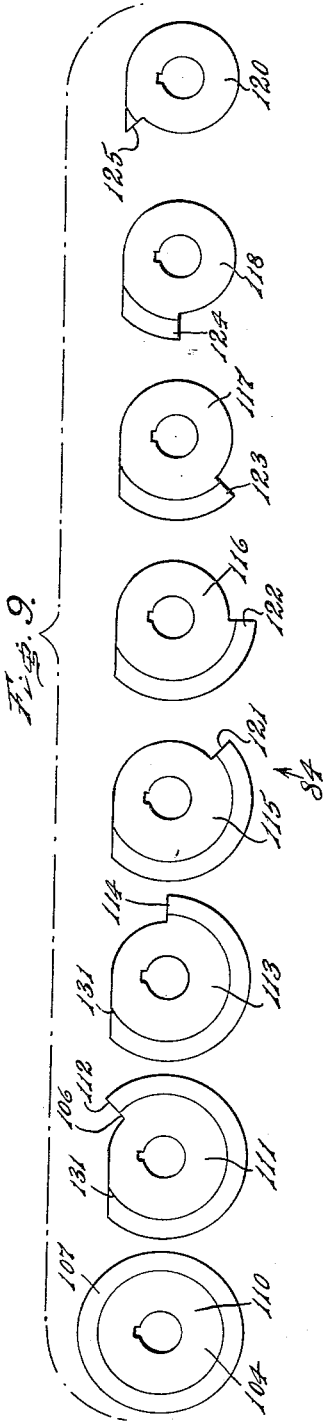
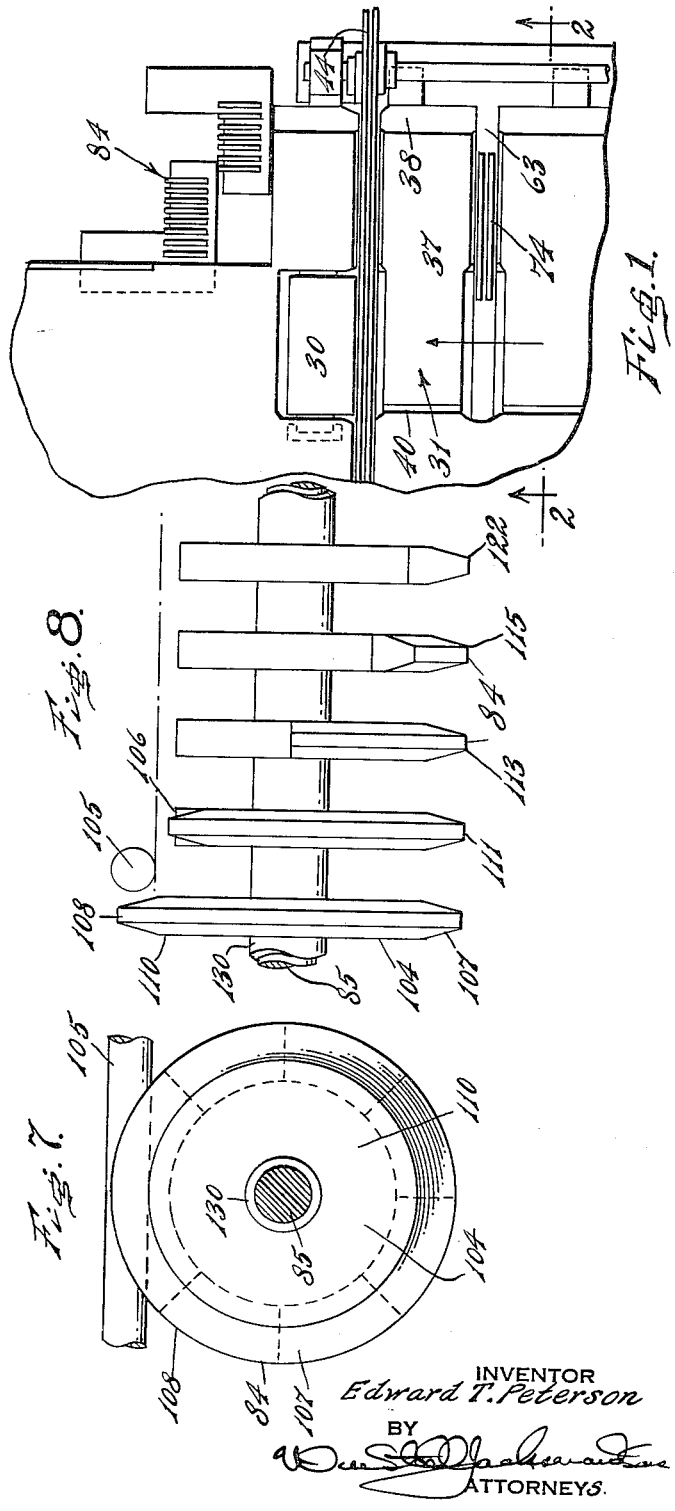
INVENTOR
Edward T. Peterson
BY
ATTORNEYS.

Aug. 28, 1962     E. T. PETERSON     3,051,293
BAR SEPARATOR
Filed March 23, 1960                                 5 Sheets-Sheet 2
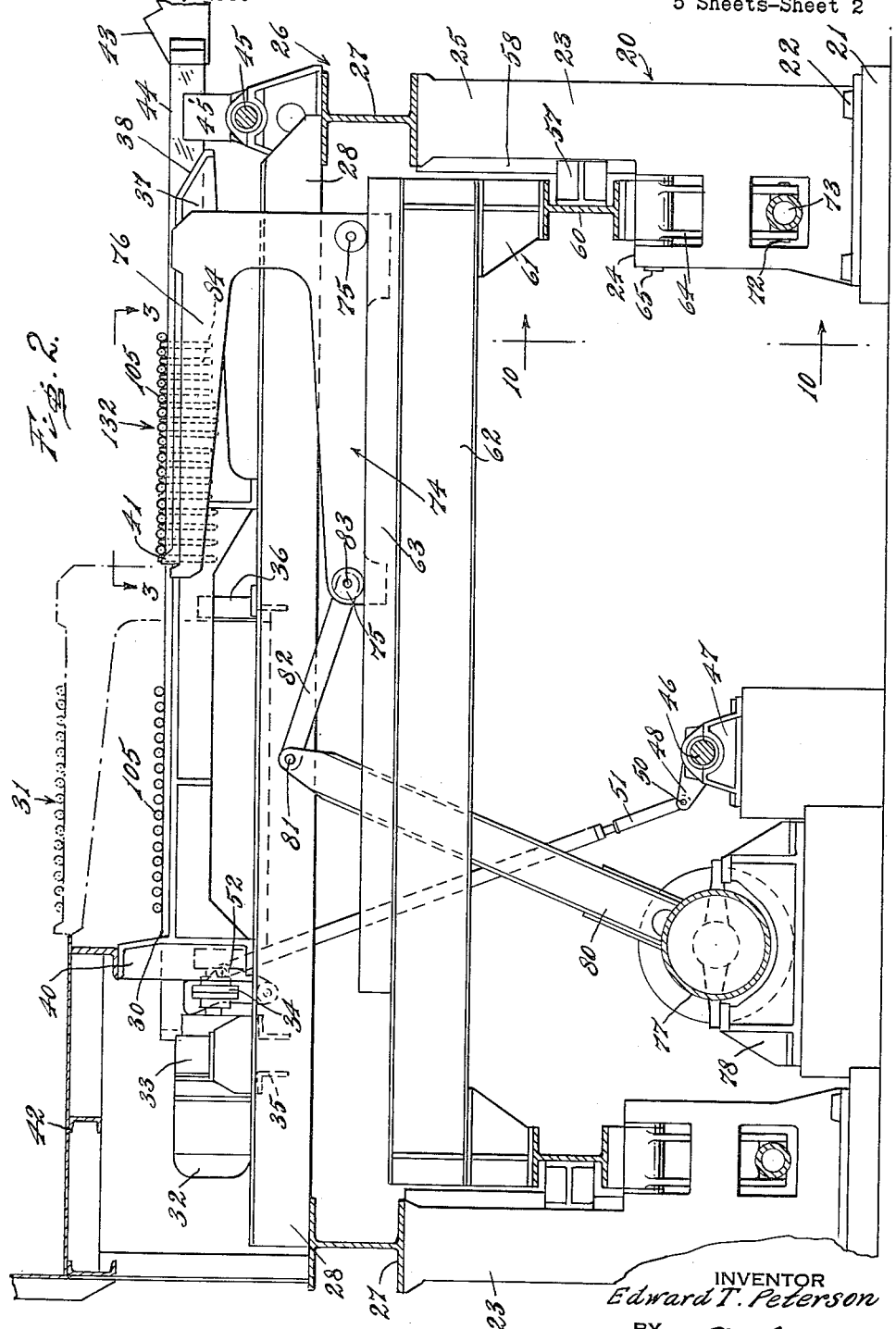
INVENTOR
Edward T. Peterson
BY
ATTORNEYS

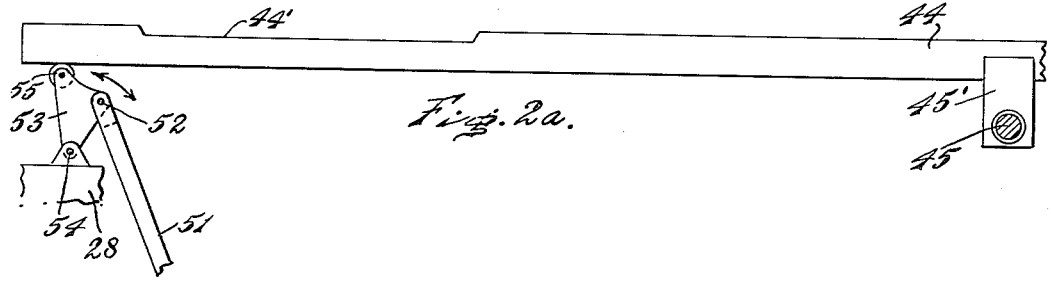
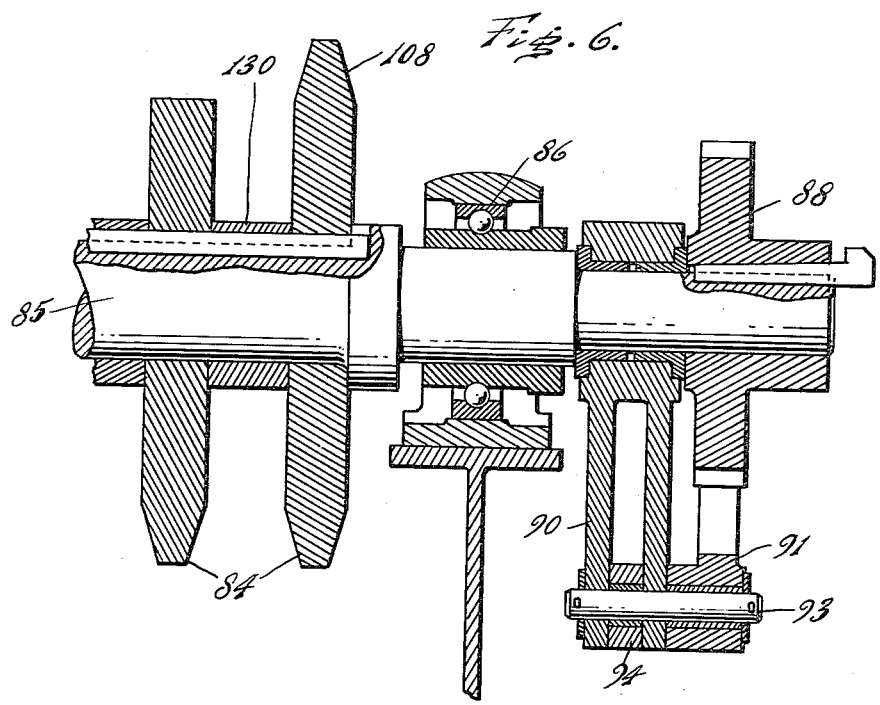
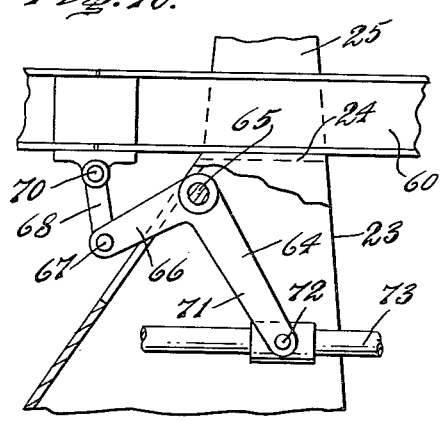

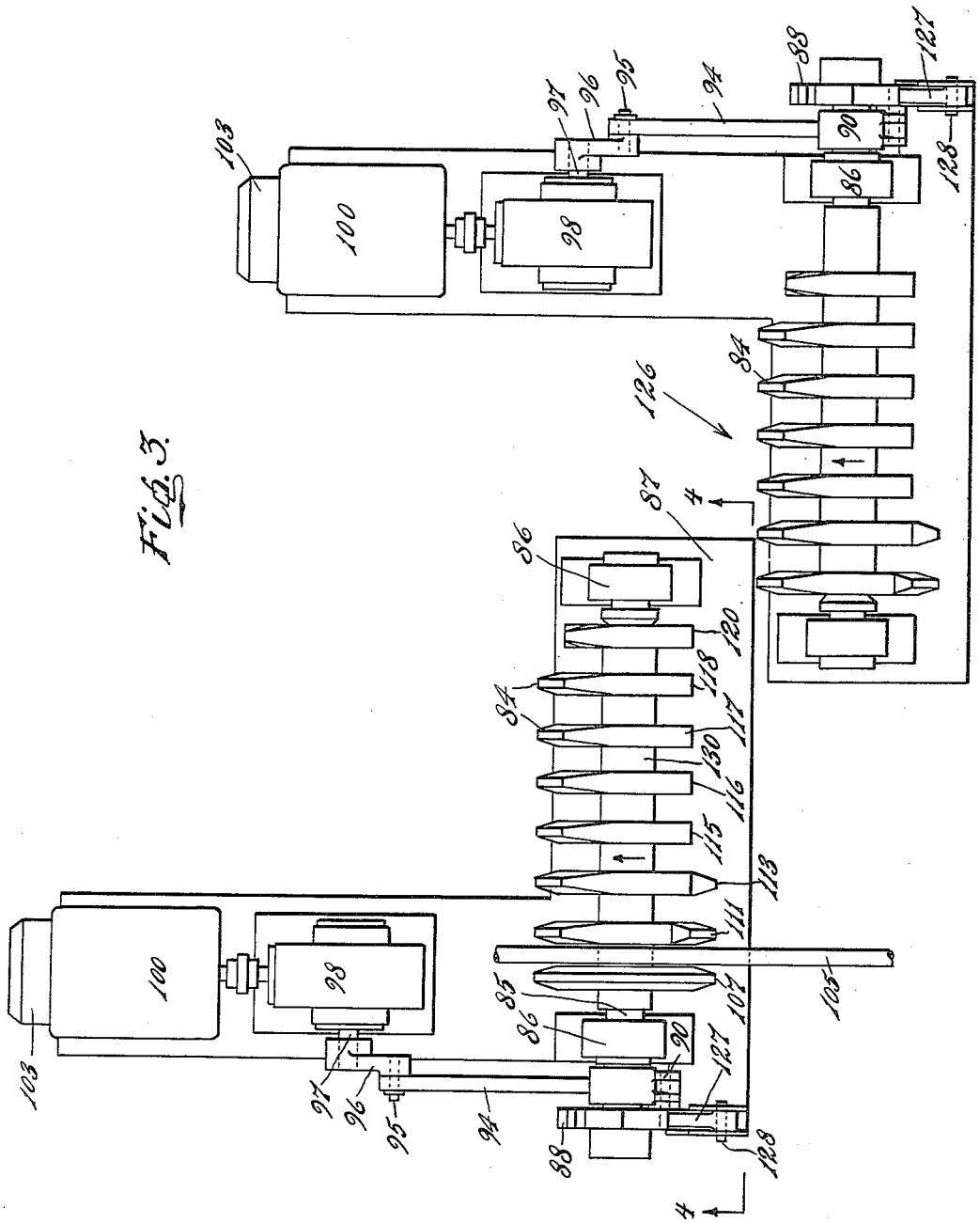

United States Patent Office 3,051,293
Patented Aug. 28, 1962

3,051,293
BAR SEPARATOR
Edward T. Peterson, Reading, Pa., assignor to Birdsboro Corporation, Birdsboro, Pa., a corporation of Pennsylvania
Filed Mar. 23, 1960, Ser. No. 17,186
4 Claims. (Cl. 198—34)

The present invention relates to cooling beds and particularly to bar separators therefor.

The purpose of the invention is to precisely regulate the separation between the bars on a cooling bed.

A further purpose is to move successive indexing discs into position between the bars of a cooling bed by rotating the discs, the first disc having the indexing portion farthest advanced, and the last disc having the indexing portion least far advanced angularly.

A further purpose is to advance the indexing portions of a sequence of indexing discs successively by turning a shaft mounting the discs through ratchet means.

A further purpose is to introduce wedge shaped indexing portions between bars on an assembly table of a cooling bed to separate the bars.

Further purposes appear in the specification and in the claims.

In the drawings I have chosen to illustrate one only of the numerous embodiments in which the invention may appear, selecting the forms shown from the standpoints of convenience in illustration, satisfactory operation and clear demonstration of the principles involved.

FIGURE 1 is a fragmentary top plan view of the assembly table and runout table portion of a cooling bed embodying the principles of the invention.

FIGURE 2 is an enlarged section of FIGURE 1 on the line 2—2.

FIGURE 2a is a fragmentary view of a portion of FIGURE 2, with structure broken away.

FIGURE 3 is a fragmentary enlarged top plan view showing the bar separator mechanism of the invention omitting the related equipment.

FIGURE 6 is a fragmentary section on the line 6—6 of FIGURE 5.

FIGURE 7 is an enlarged section on the line 7—7 of FIGURE 4.

FIGURE 8 is a fragmentary elevation of a series of index discs on the same shaft.

FIGURE 9 is an exploded elevation of a set of index discs.

FIGURE 10 is a section on the line 10—10 of FIGURE 2.

Figure 4:
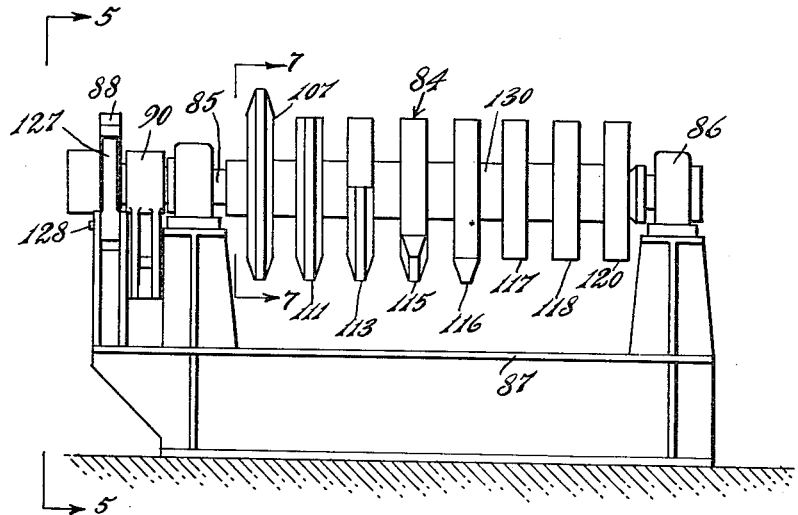
FIGURE 4 is a fragmentary section of FIGURE 3 on the line 4—4.

Describing in illustration but not in limitation and referring to the drawings:

In a cooling bed which is utilized for handling metallic bars, difficulty has been encountered because of the fact that a succession of bars which reach the runout table at the same time and are run out to the shear may be improperly laterally spaced, so that they do not properly coordinate with grooves in the shear, and may in some cases be slightly misaligned and poorly sheared.

The present invention makes possible the precise lateral spacing of the bars at the forward ends which are to travel to the shear, or if desired the invention may be used at a plurality of points along the lengths of the stock bars to provide control of spacing at intervals.

In accordance with the invention index discs having index projections are turned step by step as under the action of a ratchet so that they are successively introduced between pairs of stock bars, and so that the index projection which has been raised behind a preceding bar will act as a stop for correctly positioning the next bar as it arrives laterally from the cooling bed.

Considering now the drawings in detail, a foundation 20 consists of a bed 21 in which is anchored foundation bolts 22 which secure thereon pedestals 23 provided with shelves 24 and uprights 25 as well known in the art. A superstructure 26 is rigidly mounted on the uprights and includes longitudinal main beams 27, and cross beams 28 secured thereto. The cross beams support driven rollers 30 of a runout table 31, the rollers being driven through motors 32, speed reducers 33 and couplings 34. Brackets 35 extend transversely between the cross beams to support the motors. The runout table rollers are supported on pillow blocks 36 which rest on the cross beams.

An apron 37 secured to the cross beams is tapered at 38 at the end toward the cooling bed and flanged at 40 at the opposite end beyond the runout table. A barrier 41 extends up from the apron surface at the side toward the cooling bed. The level of the apron is below the rollers of the runout table.

An inspection platform 42 is carried across along one side of the runout table.

The cooling bed is suggested by the ends of the cooling bed bars 43, which deposit the stock bars 105 on cooling bed shuffle bars 44 which run longitudinally to and are pivoted at the end toward the cooling bed on bearing blocks 45' journalling to eccentric throws on longitudinal eccentric shaft 45. The shuffle bars are arranged in spaced pairs, one bar in each pair being mounted on an eccentric throw displaced 180° from the eccentric throw on which the other bar of the pair is mounted as well known in the art.

The shuffle bars 44 have depressions 44' which coincide with the length of the table rollers 30. These depressions 44' eliminate interference with any bar pack which might be on the runout table 31, while the shuffle bars 44 are being used to assemble the next pack as later explained.

The end points of the throws of alternate eccentrics on eccentric shaft 45 lie on a common line parallel to the shaft axis so that one shuffle bar in each pair moves in unison with the corresponding shuffle bars of every other pair, while the other half of the shuffle bars also move in unison but 180° out of phase with the first bars.

The shuffle bars 44 at the end remote from their pivot are raised and lowered under the action of crankshaft 46 which is pivotally mounted on pillow blocks 47 from the foundation and which carries cranks 48 which pivotally connect at 50 with connecting rods 51. At the opposite ends the connecting rods 51 pivotally connect at 52 to bell cranks 53 which are pivotally mounted at 54 on the transverse beams 28. Each bell crank 53 carries at its upper end rollers 55 on which flat portions of the shuffle bars 44 are supported. The movement of the connecting rods 51 changes the angular position of the bell crank 53, and this changes the elevation of the rollers 55 which support the shuffle bars 44, and determines whether the shuffle bars 44 are or are not in a generally active position above the top surface of aprons 37 as well known. The rollers at the bell cranks permit transverse and angular oscillating motion of the shuffle bars as they are operated by eccentric 45.

Spaced clips 57 slidably engage vertical guides 58 on pedestals 23, and the clips connect to longitudinal beams 60 which support chairs 61 which are connected to cross beams 62 mounting transverse tracks 63.

As best seen in FIGURE 10, bell cranks 64 pivoted at 65 on the shelves 24 have lever ends 66 which pivotally connect at 67 with links 68 which pivotally connect at 70 with beams 60. The opposite lever ends 71 of bell cranks 64 pivotally connect at 72 with pull rods 73 which manipulate the tracks up and down, and are operated by cranks not shown.

On the tracks slide cars 74 having track-engaging rollers 75 and having brackets 76 which when the track is lowered are below the apron and when the track is raised rise above as illustrated by the dot-and-dash lines in FIGURE 2.

A shaft 77 journalled on pillow blocks 78 on the foundation carries lever arms 80 which pivotally connect at 81 with links 82 which pivotally connect at the opposite end at 83 with the respective cars.

The structure as thus far described in detail may be of conventional character as well known in the art.

Figure 5:
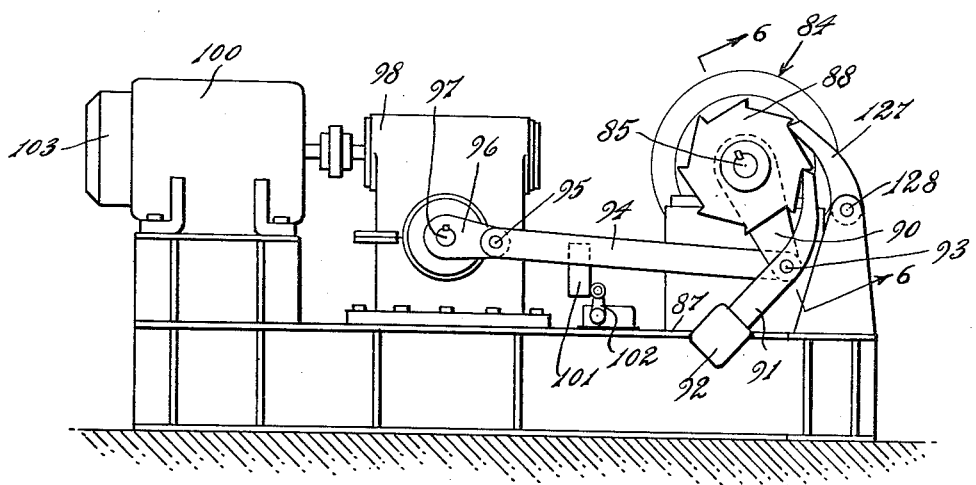
FIGURE 5 is an end elevation of the device of FIGURE 4, from the position of the line 5—5 in FIGURE 4.

Positioned at the end of the cooling bed adjoining the shear and best seen in FIGURES 1 and 3 to 9, are a series of index discs 84, which are respectively keyed on shafts 85. As best seen in FIGURE 3, two separate bar separators cooperate, each having a shaft and a set of index discs, the entire combination forming effectively one sequence of index discs.

Each shaft 85 is journalled on bearings 86 mounted on a bed 87. At one end each shaft 85 has keyed thereon a ratchet 88. The shaft also has freely turning thereon a pawl arm 90 which pivotally mounts a pawl 91 having a counterweight 92 which urges the pawl continuously into engagement with the ratchet teeth. The pivot 93 of the pawl also pivotally connects to a connecting rod 94 which pivotally connects at 95 to a crank 96 which is operatively rotated by shaft 97, driven by speed reducer 98 from motor 100.

The connecting rod carries a switch operating abutment 101 which at each cycle trips limit switch 102 so as to disconnect the motor and apply built-in magnetic brake 103 as soon as the device advances one ratchet tooth.

As best seen in FIGURES 7, 8 and 9, each index disc 84 has a hub portion 104 whose diameter is small enough so that the index disc hub portion does not extend up between the stock bars 105. To further protect against interference, the hub portion at places where engagement with the stock is not desired is cut away or reduced in diameter at 106.

Each of the index discs also has an index portion 107 which has a flattened wedge cross section as best seen in FIGURES 6 and 8. The first disc 110 of the sequence has the index portion 107 extending circumferentially entirely around the disc. The next index disc 111 has the index portion starting at 112 at about 45° from the key slot position as viewed clockwise in FIGURE 9. The next index disc 113 starts the index portion at 114 approximately 90° from the key slot as viewed in the same manner and the successive index discs 115, 116, 117, 118 and 120 each start the index portion at 121, 122, 123, 124 and 125 at a suitable angle say 45° behind the corresponding portion of the preceding disc.

Where a second set of index discs 126 is used, a similar arrangement is provided on the next shaft except that the first index disc 110 is eliminated.

In order to perform proper indexing, a back stop pawl 127 pivoted at 128 and biased by its own weight against the ratchet is employed.

The various index discs on the shafts are spaced at the desired distance thereon by spacer discs 130.

It will be evident that each of the index discs except the first, besides having a forward radial edge as described, has a trailing tangential edge 131 as best seen in FIGURE 9.

In operation of the device of the invention, hot stock bars or rods are carried laterally across a cooling bed as well known in the art, and as described for example in U.S. Patent 2,364,386, granted December 5, 1944, for Rolling Mill.

The bars 105 are disposed one after another on assembly table 132. As each stock bar comes to the assembly table, the bar spacer turns one notch of the ratchet, and this brings the bar indexing portion of the next index disc into raised position so that it acts as a stop for the next bar, whereupon the cooling bed operator discharges another stock bar from the cooling bed and by use of the shuffle bars advances the stock bar adjacent to the nearest active index disc. Then the bar separator advances one more notch and brings the next index disc up, thus assuring that the previous stock bar will be held separate from the next stock bar.

It will be evident that the bars coming off the end of the cooling bed may be slightly bent or may have one end advanced by the shuffle bars at a relatively greater rate than the other end, so that the portion of the stock bar which should contact the index disc may be prevented from so doing because the stock bar is restrained from moving any farther in the transverse direction as a result of contact at some other point along its length. The fact that there are wedge ends on the indexing portions of the index discs permits precise determination of the spacing and assures that the stock bar axis will be adjacent the center of the space between two index discs, since the wedge sides of two adjoining index discs tend to cam the stock bar and particularly the end thereof into center position.

The operator can manually advance the bar separator one notch each time a new stock bar is moved across the cooling bed by starting a new cycle of operation on the appropriate motor 100, or the operation of the bar separator can be coordinated with the operation of the cooling bed as desired. As long as one index disc is raised above the top of the apron at the assembly table, all discs which are located closer to the cooling bed than that disc remain beneath the apron and out of the way.

When the assembled group of stock bars are to be removed to the runout table, the cars 76 rise vertically with their tracks 63 under the action of pull-rods 73, thus lifting the stock bars out of the bar separators. The transfer of the assembled set of stock bars to the runout table is accomplished by moving the shaft 77 and the associated mechanism in the manner well known by the art.

In order to re-index the bar separators to start a new cycle it is merely necessary to continue rotating forward until the first index disc is the only one which is raised.

It will be evident that by using smaller angles of advance between the indexing surfaces of the index discs, larger numbers of separator discs can be employed as desired.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A bar separator including means for supporting a succession of stock bars side by side and for advancing the same transversely to their lengths, in combination with a shaft located beneath the stock bars and extending transverse to the lengths of the stock bars, a plurality of index discs on the shaft each having a portion of limited radial extent and a portion of greater radial extent, the portion of limited radial extent being of sufficient radius to block the transverse advance of the stock bars and the portion of greater radial extent being of sufficient radius to block the transverse advance of the stock bars, the portions of the index discs of greater radius starting at successive angular positions around the shaft, the index disc whose indexing portion is at the most retarded position angularly being the last of the sequence and the other indexing discs having their indexing portions angularly disposed in sequence toward the first disc, and means for rotating the portion of greater radial extent of a particular index disc from a position in which said index disc is entirely below the transverse advance of the stock bars into a position in which the said portion of greater radial extent blocks the transverse advance of the stock bars.

2. A bar separator of claim 1, in which the indexing portions of each of the index discs are of wedge cross section.

3. A bar separator of claim 1, in which the means for rotating the portion of greater radial extent of a particular index disc includes ratchet means.

4. A bar separator including means for supporting a succession of stock bars side by side and for advancing the same transversely to their lengths, in combination with a succession of shafts, each shaft being located beneath the stock bars and extending transverse to the lengths of the stock bars, a sequence of index discs on each shaft, each index disc having a portion of limited radial extent and a portion of greater radial extent, the portion of limited radial extent being of sufficient radius to block the transverse advance of the stock bars, the portions of greater radial extent of the index discs being angularly disposed so that the last index disc of the combination of index discs has the portion of greater radial extent angularly least advanced and the succession of index discs toward the first index disc has the portion of greater radial extent more advanced angularly, and means for rotating the portion of greater radial extent of a particular index disc from a position in which said index disc is entirely below the transverse advance of the stock bars into a position in which the said portion of greater radial extent blocks the transverse advance of the stock bars.

References Cited in the file of this patent
UNITED STATES PATENTS
1,691,645    Dahlstrom _____ Nov. 13, 1928